(12) United States Patent
Rimai et al.

(10) Patent No.: US 12,466,216 B2
(45) Date of Patent: Nov. 11, 2025

(54) NON-PNEUMATIC TIRE HAVING SUPPORT STRUCTURE WITH STRESS-CONCENTRATION REDUCTION FEATURES

(71) Applicant: Bridgestone Americas Tire Operations, LLC, Nashville, TN (US)

(72) Inventors: Benjamin E. Rimai, Copley, OH (US); Bradley S. Plotner, Canton, OH (US); Brandon P. Nelson, Stow, OH (US); Timothy M. Lusk, Akron, OH (US); Andrew V. Haidet, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 466 days.

(21) Appl. No.: 18/009,829

(22) PCT Filed: Jun. 15, 2021

(86) PCT No.: PCT/US2021/037429
§ 371 (c)(1),
(2) Date: Dec. 12, 2022

(87) PCT Pub. No.: WO2022/005741
PCT Pub. Date: Jan. 6, 2022

(65) Prior Publication Data
US 2023/0219366 A1    Jul. 13, 2023

Related U.S. Application Data

(60) Provisional application No. 63/045,339, filed on Jun. 29, 2020.

(51) Int. Cl.
*B60C 7/14* (2006.01)
*B60B 9/26* (2006.01)
*B60C 7/18* (2006.01)

(52) U.S. Cl.
CPC ............. *B60C 7/146* (2021.08); *B60B 9/26* (2013.01); *B60C 7/143* (2013.01); *B60C 7/18* (2013.01)

(58) Field of Classification Search
CPC .. B60C 7/14; B60C 7/18; B60C 7/146; B60C 7/143; B60C 7/107; B60B 9/26; B29D 30/02
See application file for complete search history.

(56) References Cited

U.S. PATENT DOCUMENTS

| | | | | |
|---|---|---|---|---|
| 620,061 | A | * | 2/1899 | Townsend ................. B60B 9/26 152/80 |
| 7,201,194 | B2 | * | 4/2007 | Rhyne ...................... B60C 7/10 152/5 |

(Continued)

FOREIGN PATENT DOCUMENTS

| | | |
|---|---|---|
| CN | 103068592 | 4/2013 |
| CN | 105437856 | 3/2016 |

(Continued)

OTHER PUBLICATIONS

International Search Report; Corresponding PCT Application PCT/US2021/037429; Authorized Officer Seung Hoon Bahng; Sep. 27, 2021.

(Continued)

*Primary Examiner* — Kip T Kotter
(74) *Attorney, Agent, or Firm* — Shaun J. Fox; Bryan J. Jaketic

(57) ABSTRACT

A non-pneumatic and method of making a non-pneumatic tire. The non-pneumatic tire includes a lower ring having a first diameter and an upper ring having a second diameter greater than the first diameter. The upper ring is substantially coaxial with the lower ring. A support structure extends between the lower ring and the upper ring. The support structure includes a first face and a second face opposite the (Continued)

first face, a first axial edge and a second axial edge. The first and second axial edges space the first face from the second face. At least one of the first edge and the second edge may have a geometry that provides the support structure with a nonrectangular cross section. At least one of the first face and the second face may have a surface roughness of less than 25 microns. The support structure may be free from orthogonal axial edges.

13 Claims, 5 Drawing Sheets

(56) References Cited

U.S. PATENT DOCUMENTS

| | | | |
|---|---|---|---|
| 2013/0240097 A1 | 9/2013 | Cron et al. | |
| 2016/0121656 A1 | 5/2016 | Sugiya | |
| 2018/0250986 A1* | 9/2018 | Rhyne | B60B 9/26 |
| 2020/0009916 A1 | 1/2020 | Thompson et al. | |

FOREIGN PATENT DOCUMENTS

| | | |
|---|---|---|
| CN | 108562481 | 9/2018 |
| CN | 109996685 | 7/2019 |
| CN | 209466919 | 10/2019 |
| EP | 3088208 | 11/2016 |
| EP | 3543036 | 9/2019 |
| JP | 11-510454 | 9/1999 |
| JP | 2007-69405 | 3/2007 |
| JP | 2008132951 | 6/2008 |
| JP | 2013-536125 | 9/2013 |
| JP | 2015-000609 | 1/2015 |
| JP | 2105518448 | 7/2015 |
| JP | 2016130071 | 7/2016 |
| JP | 2018-79886 | 5/2018 |
| WO | 2019089008 | 5/2019 |
| WO | 2019089726 | 5/2019 |

OTHER PUBLICATIONS

Written Opinion; Corresponding PCT Application PCT/US2021/037429; Authorized Officer Seung Hoon Bahng; Sep. 27, 2021.

Supplementary European Search Report; Corresponding EP Application Serial No. 21832221; Jun. 5, 2024.

Office Action; corresponding JP Patent Application Serial No. 2022-578656; May 7, 2024.

English Translation of Office Action; corresponding JP Patent Application Serial No. 2022-578656; May 7, 2024.

* cited by examiner

_US 12,466,216 B2_

NON-PNEUMATIC TIRE HAVING SUPPORT STRUCTURE WITH STRESS-CONCENTRATION REDUCTION FEATURES

FIELD OF INVENTION

The present disclosure relates to a tire. More particularly, the present disclosure relates to a non-pneumatic tire having support structure with stress-concentration reduction features.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects a lower ring to an upper ring.

SUMMARY OF THE INVENTION

In one embodiment, a non-pneumatic tire includes a lower ring having a first diameter and an upper ring having a second diameter greater than the first diameter. The upper ring is substantially coaxial with the lower ring. A plurality of spokes extends between the lower ring and the upper ring. Each one of the plurality of spokes includes a first face and a second face opposite the first face, a first axial edge and a second axial edge. The first and second axial edges space the first face from the second face. At least one of the first edge and the second edge has a geometry that provides the spoke with a nonrectangular cross section.

In another embodiment, a method of making a non-pneumatic tire includes providing a lower ring having a first diameter, providing an upper ring having a second diameter greater than the first diameter, and arranging the upper ring to be substantially coaxially with the lower ring. The method further includes forming a plurality of spokes with a non-rectangular cross section. Each one of the plurality of spokes includes a first face and a second face opposite the first face, and a first axial edge and a second axial edge. The first and second axial edges space the first face from the second face. At least one of the first edge and the second edge has a geometry that provides the spoke with the nonrectangular cross section. The method further includes attaching the lower ring and the lower ring to one another using the plurality of spokes.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
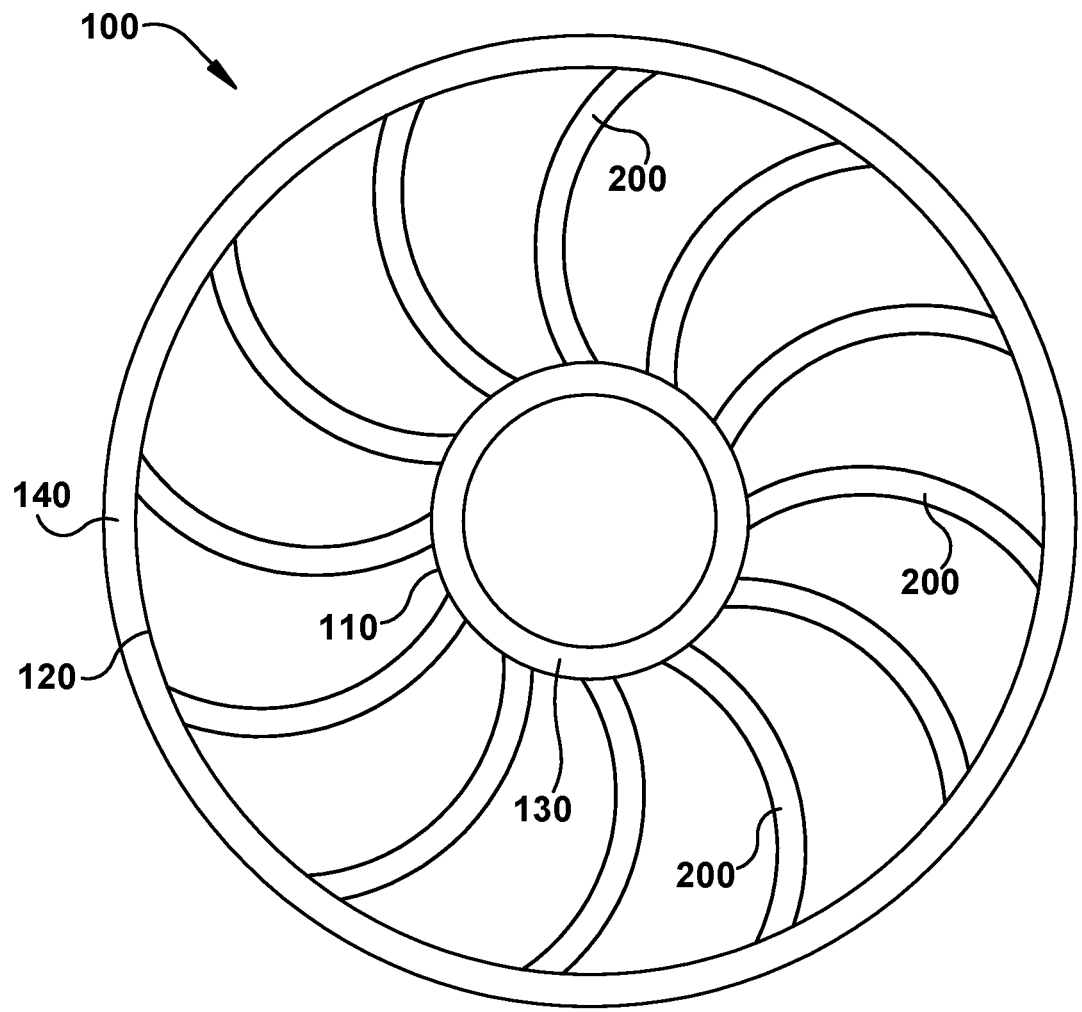
FIG. 1 is a front view of one embodiment of a non-pneumatic tire.
Figure 2:
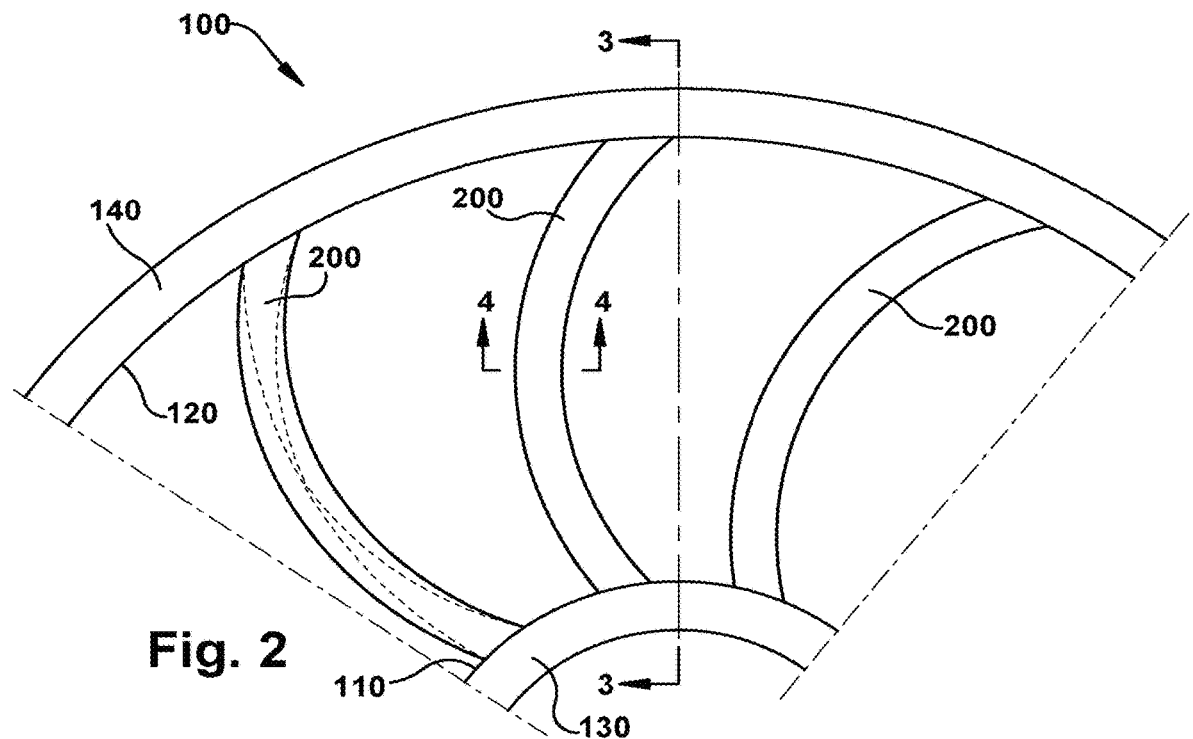
FIG. 2 is an enlarged partial front view of the non-pneumatic tire of FIG. 1.

FIGS. 1 and 2 are front views of one embodiment of a non-pneumatic tire 100. The non-pneumatic tire 100 includes a lower ring 110 having a first diameter, and an upper ring 120 having a second diameter greater than the first diameter. The upper ring 120 is substantially coaxial with the lower ring 110. In the illustrated embodiment, the lower ring 110 is shown as being attached to a hub 130.

A circumferential tread 140 is disposed about the upper ring 120. The tread 140 may include tread elements such as grooves, ribs, blocks, lugs, sipes, studs, and other elements. A shear band or other shear element or reinforcement structure (not shown) may be disposed between the upper ring 120 and the tread 140. In an alternative embodiment, the separate tread may be omitted and instead tread elements may be formed directly on the upper ring.

In the illustrated embodiment, a plurality of spokes 200 extend between the lower ring 110 and the upper ring 120. In this embodiment, the design of each one of the plurality of spokes 200 is substantially identical. Accordingly, further description of the plurality of spokes 200 will be made with reference to a single spoke. However, in an alternative embodiment, the plurality of spokes may include spokes having different designs.

Figure 3:
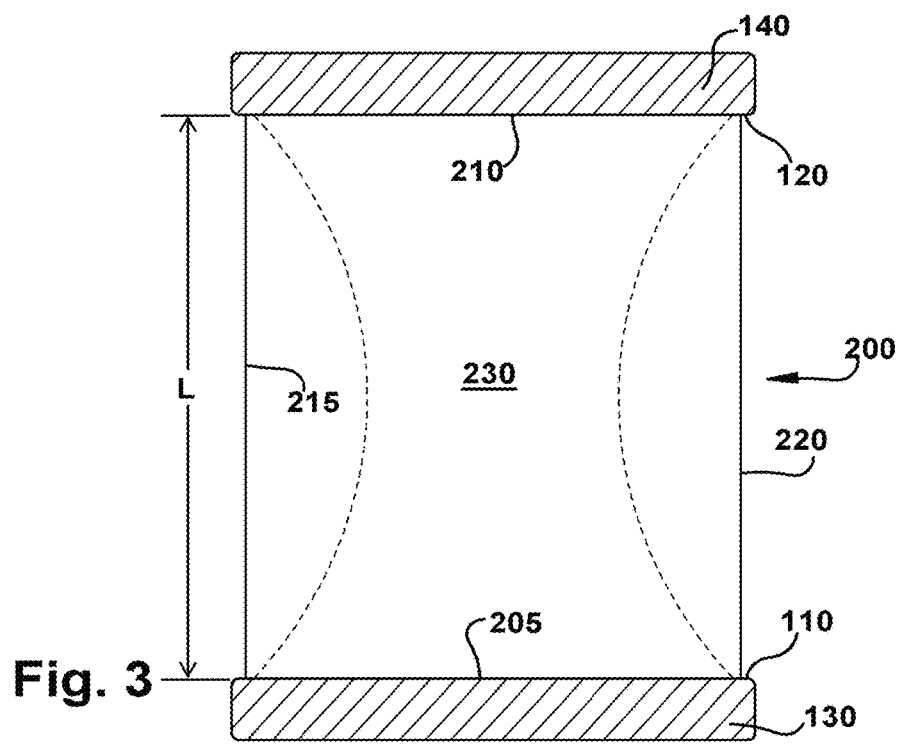
FIG. 3 is a view of the non-pneumatic tire of FIG. 2 along 3-3.
Figure 4:
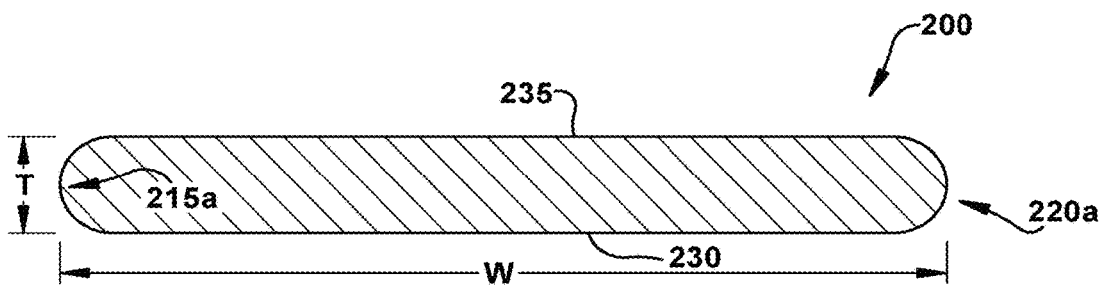
FIG. 4 is a cross-sectional view of a spoke of the non-pneumatic tire of FIG. 2 taken along 4-4.

Referring to FIGS. 3 and 4, the spoke 200 extends between a first end 205 and a second end 210 along a generally radial direction of the non-pneumatic tire 100 to define a spoke length L. The first end 205 is attached to the lower ring 110. The second end 210 is attached to the upper ring 120. Non-limiting examples of how the spoke ends 205, 210 may be attached to the lower ring 110 and the upper ring 120 include adhesive, molding, or mechanical fasteners. Alternatively, the spoke 200 and at least one of the lower ring 110 and the upper ring 120 may be a single, unitary construction.

In the illustrated embodiment, the first end 205 and the second end 210 are each directly attached to the lower ring 110 and the upper ring 120, respectively. In an alternative embodiment, the first end 205 or the second end 210 may be indirectly attached to the lower ring 110 and the upper ring 120, respectively. For example, the first end 205 and/or the second end 210 may be attached to the respective lower ring 110 and outer 120 ring by a damper, spacer, or any desired structure.

The spoke 200 also extends between a first edge 215 and a second edge 220 along a generally axial direction of the non-pneumatic tire 100 to define a spoke width W. In the illustrated embodiment, the spoke width W is less than the width of both the lower ring 110 and the upper ring 120, and the width of the lower ring 110 is equal to the width of the upper ring 120. In an alternative embodiment, the width of the spoke may be greater than, equal to, or less than the width of the lower ring or the upper ring. In another alternative embodiment, the width of the lower ring may be greater than or less than the width of the upper ring.

In the illustrated embodiment, the spoke width W is constant along the spoke length L. In an alternative embodiment, the width W of the spoke 200 may vary along the spoke length L. Such variable width may provide the spoke 200 with desired performance characteristics. For example, beginning from an intermediate point between the first end 205 and the second end 210, the spoke 200 may taper outwards such that the spoke width W at the first and second ends 205, 210 is greater than the spoke width at the intermediate point. According to this example, the intermediate point defines a reduced width portion. This tapered arrangement is shown in phantom with dotted lines in FIG. 3. The reduced width of the intermediate point may encourage bending/flexing of the spoke 200 at the intermediate point, which may be a desirable characteristic in certain applications. In an alternative embodiment, the reduced width portion may be located at any desired point along the length L of the spoke 200. In another alternative embodiment, the spoke 200 may have multiple reduced width portions.

The spoke 200 includes a first face 230 and a second face 235, as can be best seen in FIG. 4. In the illustrated embodiment, each of the first face 230 and the second face 235 extend linearly in the axial direction and extends substantially parallel with the axial direction of the non-pneumatic tire 100. In an alternative embodiment, the first face or the second face may extend in a non-linear fashion in the axial direction. In another alternative embodiment, the first face or the second face may be angled relative to the axial direction of the non-pneumatic tire.

The first and second edges 215, 220 space the first face 230 from the second face 235. The spoke 200 extends between the first face 230 and the second face 235 along a circumferential direction of the non-pneumatic tire 100 to define a spoke thickness T. In the illustrated embodiment, the spoke thickness T is constant along the spoke length L. In one example, the spoke thickness T is between 0.050-0.062 inches. However, the spoke may have any desired thickness.

In an alternative embodiment, the thickness T of the spoke 200 may vary along the spoke length L. Such variable thickness may provide the spoke 200 with desired performance characteristics. For example, beginning from an intermediate point between the first end 205 and the second end 210, the spoke 200 may taper outwards such that the spoke thickness T at the first and second ends 205, 210 is greater than the spoke thickness at the intermediate point. According to this example, the intermediate point defines a reduced thickness portion. This tapered arrangement is shown in phantom with dotted lines on one of the spokes in FIG. 2. The relatively reduced thickness of the intermediate point may encourage bending/flexing of the spoke 200 at the intermediate point, which may be a desirable characteristic in certain applications. In an alternative embodiment, the reduced thickness portion may be located at any desired point along the length L of the spoke 200. In another alternative embodiment, the spoke 200 may have multiple reduced thickness portions.

In the illustrated embodiments, the first edge and the second edge 215, 220 of the spoke 200 has a geometry that gives the spoke 200 a nonrectangular cross section. In each of these embodiments, the edges may be described as tapered. FIG. 4 illustrates one example in which the edges are rounded. In other words, the geometry of each of the first edge and the second edge 215a, 220a is a continuously curved surface having a semi-circle cross section. The radius of curvature of the continuously curved surface may be one half the thickness of the spoke (i.e., 0.5 T). However, the radius of curvature of the continuously curved surface may be any desired value.

Figure 5A:
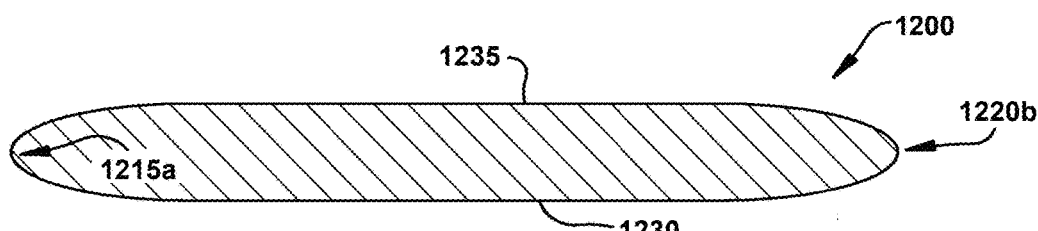
FIGS. 5A-5C are cross-sectional views of alternative embodiments of spokes for non-pneumatic tires.
Figure 5B:
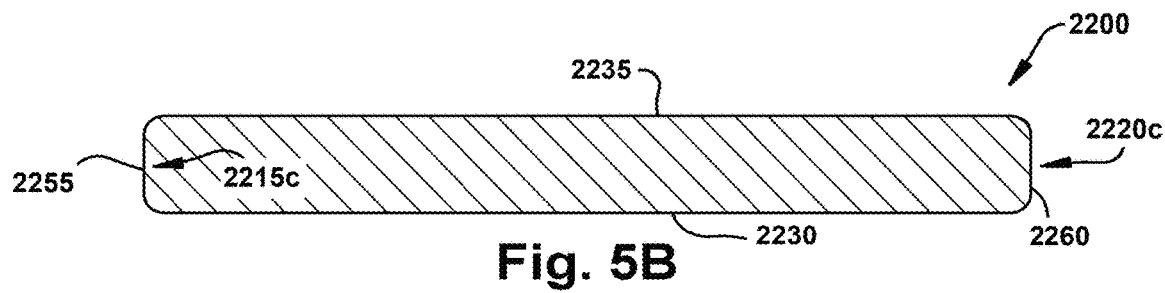
Figure 5C:
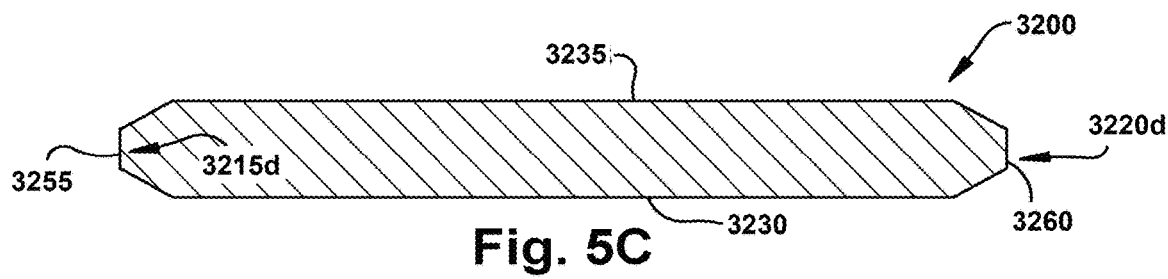

Known spokes having a rectangular cross section with orthogonal axial edges may be sensitive to surface imperfections (e.g., scratches, gouges, nicks) that could grow into a crack that may result in failure of the spoke. The continuously curved surface geometry of the first and second edges 215a, 220a of the spoke 200 shown in FIG. 4 eliminates the orthogonal axial edges and provides the spoke 200 with a nonrectangular cross section. This arrangement may reduce the sensitivity of the spoke 200 to such minor imperfections and enhance fatigue life of the spoke 200, thereby increasing the robustness of the spoke 200 over known spoke designs FIGS. 5A-5C illustrate alternative edge geometries that may be employed. It should be understood that these embodiments are merely exemplary, and additional geometries may be employed that provide greater complexity than a rectangular cross-section. In the embodiment of the spoke 1200 shown in FIG. 5A, the geometry of the first edge and the second edge 1215b, 1220b is a continuously curved surface having a semi-elliptical cross section. In another alternative embodiment, the geometry of the first or second edges 215, 220 may be a continuously curved surface defined by a plurality of radii. In yet another alternative embodiment, the first or second edges 215, 220 may be a continuously curved surface having any desired cross section. In yet another alternative embodiment, the geometry of only one of the first and second edges 215, 220 may be provided as a continuously curved surface.

As shown in FIGS. 5B and 5C, rather than a continuously curved surface, the geometry of the first and second edges may include a respective straight portion. In this case, as shown in the spoke 2200 of FIG. 5B, the geometry of the first edge and the second edge 2215c, 2220c includes a curved surface between the straight portions 2255, 2260 and the faces 2230, 2235. In other words, the first and second edges 2215c, 2220c have rounded corners. In another example, as shown in the spoke 3200 of FIG. 5C, the geometry of the first edge and the second edge 3215d, 3220d includes a linear surface between the straight portions 3255, 3260 and the faces 3230, 3235. In other words, the first and second edges 3215d, 3220d have chamfered corners.

In each of the foregoing examples, the geometry of the first edge and the second edge 215, 220 eliminates the orthogonal axial edge of known spoke designs. Regardless of the specific geometry employed, providing a spoke that is free from orthogonal axial edges enhances fatigue life and reduces sensitivity of the spoke to surface imperfections, thus improving spoke robustness.

The geometry of the first edge or the second edge 215, 220 may be any desired combination of anyone one of the foregoing described geometries, including the described continuously curved surface. The geometries of the first and second edges 215, 220 may be formed using any desired manufacturing process. Non-limiting examples of manufacturing processes that may be used to form the geometries of the first and second edges 215, 220 include rolling, shot peening, hydroforming, flow forming, or roll forming.

According to one example, the geometry of the first edge or the second edge 215, 220 may be provided by initially forming the edge using laser cutting, skiving, or any other desired cutting process. Then, the cut edges may be subsequently treated with a rolling process, shot peening process, or both to provide a rounded edge with a desired smoothness. In alternative embodiments, the first edge or the second edge may be treated with a rolling process, shot peening process, or both without prior edge forming.

To further improve the robustness of the spoke 200, the faces 230, 235 or the edges 215, 220 of the spoke 200 may be provided with a specific surface roughness. In one example, the average surface roughness of the spoke 200 is less than 25 microns, preferably less than 1.6 microns, and ideally less than 0.8 microns. These specific roughness values are considered when measuring the surface roughness of the spoke 200 along the radial direction of the non-pneumatic tire 100 and also along axial direction of the non-pneumatic tire 100. In another embodiment, the specific roughness values are considered when measuring the surface roughness of the spoke 200 along the radial direction of the non-pneumatic tire 100, but not the axial direction A of the non-pneumatic tire 100. For example, in one such embodiment, the surface may be relatively smooth in the axial direction, and relatively rough in the radial direction. Smoothing the surface in a single direction may be less time consuming and less costly. In yet another embodiment, the specific roughness values are considered when measuring the surface roughness of the spoke 200 along the axial direction of the non-pneumatic tire 100, but not the radial direction of the non-pneumatic tire 100.

The specific surface roughness may be imparted to the spoke 200 using any desired manufacturing process. Examples of manufacturing processes that may be used to impart the specific surface roughness include, but are not limited to shot peening, laser shock peening, low plasticity burnishing, machining, grinding, polishing, or lapping. Alternatively, the surface rough may be provided by an isotropic etching process, or by a chemical treatment. Using any of the foregoing processes to provide the spoke 200 with a surface roughness of less than 25 microns eliminates, or at least substantially reduces, surface imperfections on the spoke that may propagate through the spoke and result in spoke failure. The specified surface roughness of less than 25 microns enhances fatigue life of the spoke 200. Accordingly, providing a surface roughness of less than 25 microns may improve robustness of the spoke 200. Providing a roughness of less than 1.6 microns, or less than 0.8 microns may further enhance these benefits.

Figure 6A:
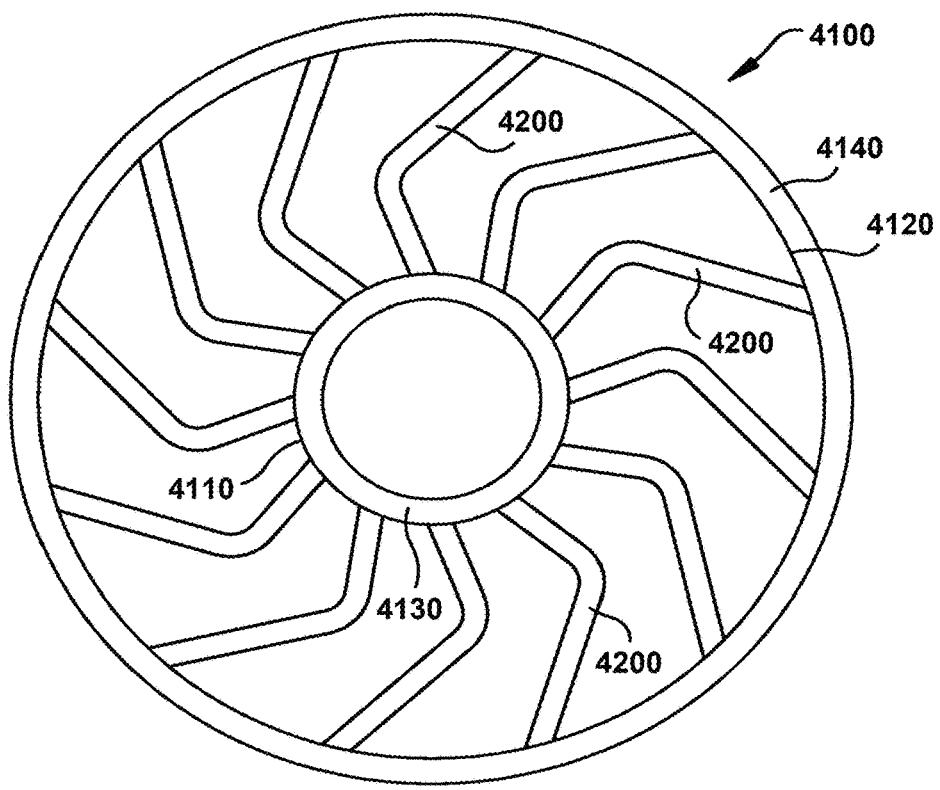
FIGS. 6A and 6B are front views non-pneumatic tires showing alternative spoke embodiments.
Figure 6B:
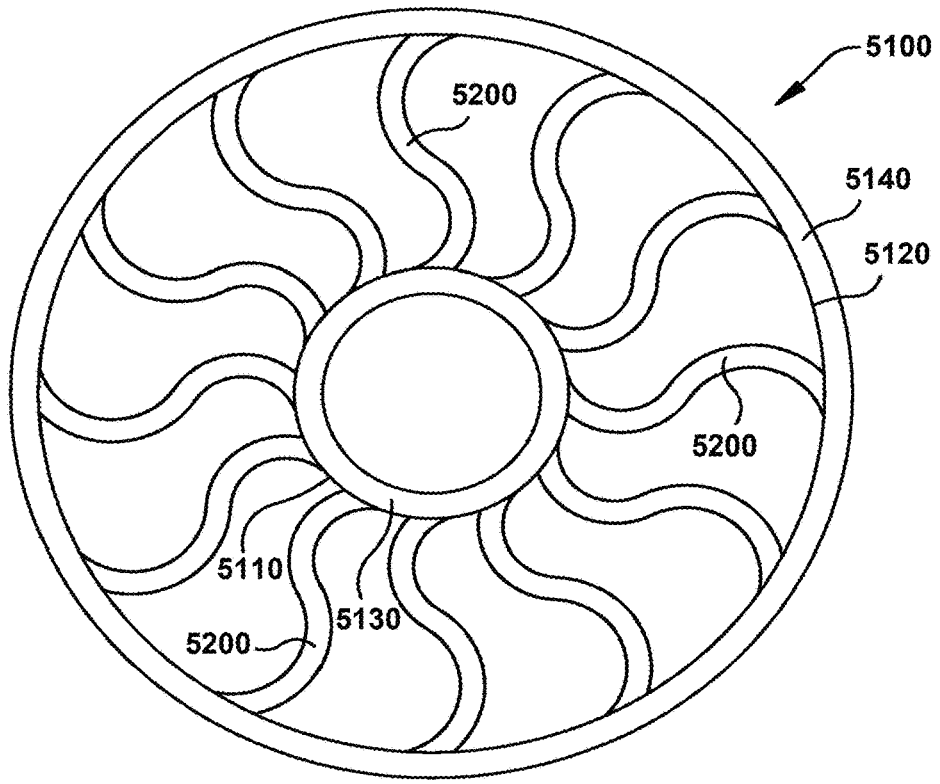

In one example embodiment, shown in FIG. 1, the spoke 200 is substantially U-shaped. In another example embodiment, shown in FIG. 6A, in which all like elements are increased by a factor of "4000", a non-pneumatic tire 4100 includes spokes 4200 that are substantially V-shaped. The spokes 4200 connect an upper ring 4120 with a circumferential tread 4140 attached thereto to a lower ring 4110 that is attached to a hub 4130. Compared to the U-shaped spoke, the V-shaped spoke has a more pronounced point between the lower ring 4110 and the upper ring 4120. In yet another example embodiment, shown in FIG. 6B, in which all like elements are increased by a factor of "5000." a non-pneumatic tire 5100 includes spokes 5200 that are serpentine shaped with two or more bends. The spokes 5200 connect an upper ring 5120 with a circumferential tread 5140 attached thereto to a lower ring 5110 that is attached to a hub 5130. In other example embodiments the spokes may be any desired shape (e.g., straight spoke). The shape of the spokes may be selected to provide desired performance characteristics.

The spoke 200 may be manufactured out of any desired material. For example, the spoke 200 may be manufactured out of high strength steels such as 4140, 4340, 1080, 1075, or 1095. As another example, the spoke 200 may be manufactured out of reinforced polymers/plastics such as those reinforced with carbon fiber, glass fiber, or aramid fiber. The spoke 200 may manufactured out of a single strip of material, or may be formed as multiple strips of material that are subsequently secured together. The spoke 200 may be provided with a coating to enhance performance characteristics of the spoke and provide physical protection, corrosion resistance, or vibration damping.

Figure 7:
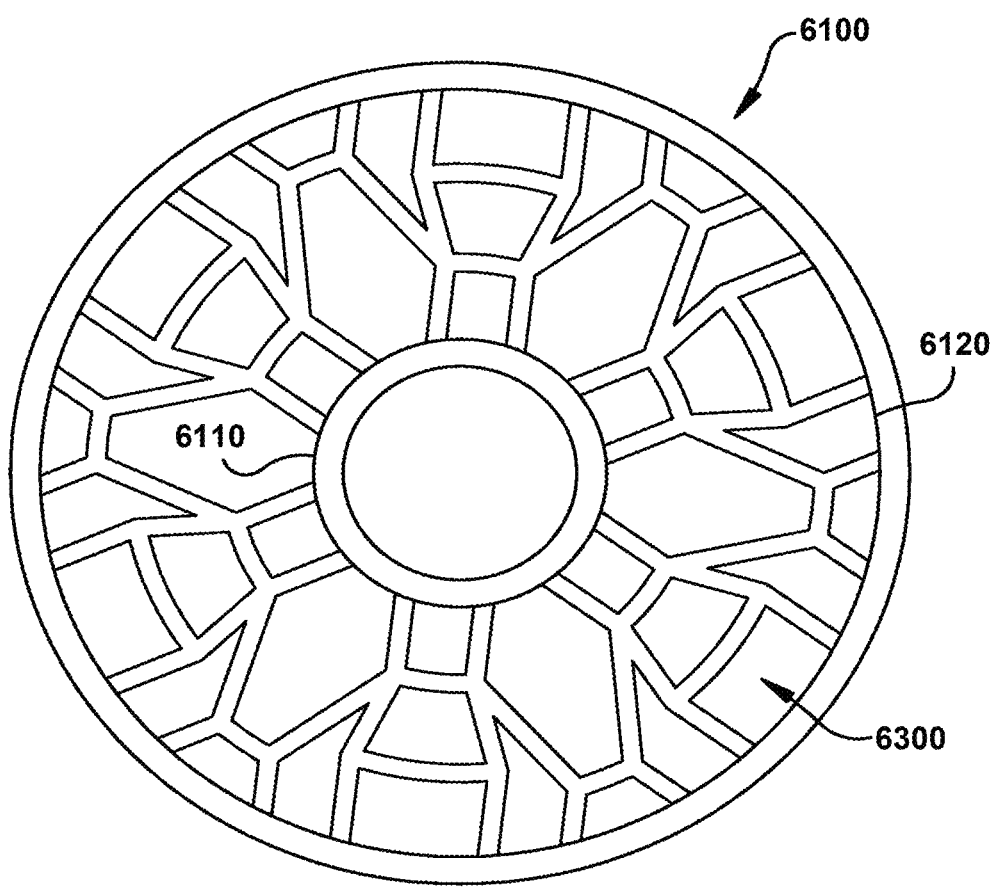
FIG. 7 is a front view of a non-pneumatic tire that utilizes a webbing.

While FIGS. 1-6 illustrate embodiments of non-pneumatic tires having spokes, it should be understood that other support structures may be used instead of spokes. For example, FIG. 7, in which all like elements are increased by a factor of "6000" illustrates one embodiment of a non-pneumatic tire 6100 having a lower ring 6110, an upper ring 6120, and a webbing 6300 extending between the upper ring and the lower ring. Aside from the use of a webbing instead of spokes, the non-pneumatic tire 6100 of FIG. 7 is otherwise substantially the same as the non-pneumatic tire 100 described above with respect to FIGS. 1-6. In other words, the webbing 6300 may have any of the edge geometries described above. Likewise, the webbing 6300 may be constructed of any of the spoke materials discussed above.

The geometry of the webbing 6300 shown in FIG. 7 is merely exemplary. It should be understood that the webbing may have any geometry. In other alternative embodiments (not shown), support structures other than spokes or webbing may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   a lower ring having a first diameter;
   an upper ring having a second diameter greater than the first diameter, the upper ring being substantially coaxial with the lower ring;
   a plurality of spokes extending between the lower ring and the upper ring, each one of the plurality of spokes including:
   a first face and a second face opposite the first face, and
   a first axial edge and a second axial edge, the first and second axial edges spacing the first face from the second face,
   wherein at least one of the first edge and the second edge has a semi-elliptical cross section, the semi-elliptical cross section geometry having a semi-major axis and a semi-minor axis, a length of the semi-major axis being greater than a length of the semi-minor axis.

2. The non-pneumatic tire of claim 1, wherein at least one of the first face and the second face has an arithmetic average surface roughness of less than 25 microns.

3. The non-pneumatic tire of claim 2, wherein the arithmetic average surface roughness of less than 25 microns is measured on the spoke along a radial direction of the non-pneumatic tire.

4. The non-pneumatic tire of claim 3, wherein the arithmetic average surface roughness of less than 25 microns is measured on the spoke along an axial direction of the non-pneumatic tire.

5. The non-pneumatic tire of claim 1, wherein each one of the spokes includes an intermediate point between a first end and a second end, and wherein each one of the spokes is tapered such that a spoke thickness in a circumferential direction of the non-pneumatic tire increases from the intermediate point to each of the first end and the second end.

6. A method of making a non-pneumatic tire comprising:
   providing a lower ring having a first diameter;
   providing an upper ring having a second diameter greater than the first diameter;
   arranging the upper ring to be substantially coaxially with the lower ring;
   forming a plurality of spokes with a nonrectangular cross section, each one of the plurality of spokes including:
   a first face and a second face opposite the first face,
   a first axial edge and a second axial edge, the first and second axial edges spacing the first face from the second face;
   wherein at least one of the first edge and the second edge has a semi-elliptical cross section geometry, the semi-elliptical cross section geometry having a semi-major axis and a semi-minor axis, a length of the semi-major axis greater than a length of the semi-minor axis; and
   attaching the lower ring and the upper ring to one another using the plurality of spokes.

7. The method of claim 6, wherein the forming of the plurality of spokes with the nonrectangular cross section includes at least one of rolling, shot peening, hydroforming, flow forming, or roll forming.

8. The method of claim 6, further comprising providing at least one of the first face and the second face with an arithmetic average surface roughness less than 25 microns.

9. The method of claim 6, The non-pneumatic tire of claim 1, wherein each one of the spokes includes an intermediate point between a first end and a second end, and wherein each one of the spokes is tapered such that a spoke thickness in a circumferential direction of the non-pneumatic tire increases from the intermediate point to each of the first end and the second end.

10. A non-pneumatic tire comprising:
    a lower ring having a first diameter;
    an upper ring having a second diameter greater than the first diameter, the upper ring being substantially coaxial with the lower ring;
    a support structure extending between the lower ring and the upper ring, the support structures including:
    a first face and a second face opposite the first face, and
    a first axial edge and a second axial edge, the first and second axial edges spacing the first face from the second face;
    wherein at least one of the first edge and the second edge includes a semi-elliptical cross section geometry, the semi-elliptical cross section geometry having a semi-major axis and a semi-minor axis, a length of the semi-major axis being greater than a length of the semi-minor axis,
    wherein the support structure is free from orthogonal axial edges.

11. The non-pneumatic tire of claim 10, wherein at least one of the first face and the second face has an arithmetic average surface roughness of less than 25 microns.

12. The non-pneumatic tire of claim 10, wherein the support structure is a plurality of spokes.

13. The non-pneumatic tire of claim 10, wherein each one of the spokes includes an intermediate point between a first end and a second end, and wherein each one of the spokes is tapered such that a spoke thickness in a circumferential direction of the non-pneumatic tire increases from the intermediate point to each of the first end and the second end.

\* \* \* \* \*